United States Patent
Fenn et al.

(10) Patent No.: US 6,806,314 B2
(45) Date of Patent: Oct. 19, 2004

(54) COATING OF HYDROXY-FUNCTIONAL POLYMER(S), CROSSLINKER, AND 1,3- AND 1,4-CYCLOHEXANE DIMETHANOLS

(75) Inventors: David R. Fenn, Allison Park, PA (US); David N. Walters, Slippery Rock, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 70 days.

(21) Appl. No.: 10/356,180

(22) Filed: Feb. 3, 2003

(65) Prior Publication Data

US 2004/0151838 A1 Aug. 5, 2004

(51) Int. Cl.[7] .......................... C08L 33/14; C08L 61/28; C08L 63/00; C08L 67/02; C08L 75/04
(52) U.S. Cl. ...................... 525/123; 525/124; 525/125; 525/128; 525/162; 525/166; 525/176; 525/403; 525/406; 525/440; 525/443; 525/456; 525/457
(58) Field of Search ................................ 525/123, 124, 525/125, 128, 162, 166, 176, 403, 406, 440, 443, 456, 457

(56) References Cited

U.S. PATENT DOCUMENTS

| | | | |
|---|---|---|---|
| 2,956,961 A | 10/1960 | Kibler et al. | 260/2.5 |
| 4,170,580 A | 10/1979 | Doerffel et al. | 524/383 |
| 4,284,750 A | 8/1981 | Amirsakis | 528/79 |
| 5,286,782 A | 2/1994 | Lamb et al. | 524/507 |
| 5,354,797 A | 10/1994 | Anderson et al. | 524/285 |
| 5,541,268 A | 7/1996 | Fenn et al. | 525/440 |
| 6,001,931 A | 12/1999 | Brahm et al. | 525/123 |

FOREIGN PATENT DOCUMENTS

| | | | |
|---|---|---|---|
| EP | 0676431 | 10/1995 | |
| JP | 06145287 A | 5/1994 | C08G/18/65 |
| JP | 2000084642 A | 3/2000 | B22C/1/22 |

*Primary Examiner*—Robert Sellers
(74) *Attorney, Agent, or Firm*—Donald R. Palladino

(57) ABSTRACT

A coating composition comprising at least one hydroxyl functional polymer, a crosslinker capable of crosslinking with said hydroxyl functional polymer (a) to form a film, and a reactive diluent comprising 1,3-cyclohexane dimethanol and 1,4-cyclohexane dimethanol.

10 Claims, No Drawings

COATING OF HYDROXY-FUNCTIONAL POLYMER(S), CROSSLINKER, AND 1,3- AND 1,4-CYCLOHEXANE DIMETHANOLS

FIELD OF THE INVENTION

The present invention relates to coating compositions; especially solvent borne coating compositions which include a reactive diluent comprising 1,3-cyclohexane dimethanol and 1,4-cyclohexane dimethanol.

BACKGROUND OF THE INVENTION

Coating compositions having a high concentration of solids ("high solids compositions") are becoming increasingly popular due to environmental regulations that limit the volatile organic solvent content in such compositions. High solids compositions contain high levels of non-volatile materials such as film-forming polymer, pigments, and fillers and low levels of organic solvent.

At present, it is difficult to formulate high solids compositions having acceptable viscosities. If the viscosity of the coating composition is high, it is difficult to spray apply the coating composition and the appearance of the applied coating is less than ideal.

Several unsatisfactory solutions have been proposed to provide high solids compositions having acceptable viscosities. One proposed solution is to use low molecular weight film-forming polymers to form the coating composition because, generally, low molecular weight polymers have low viscosities. The problem with using low molecular weight polymers is they give rise to soft coating films that have unacceptable dust free times (the time period from when a coating composition is applied to when the dust no longer adherers to the coating).

Another proposed solution has been to add a viscosity modifying additive to the coating composition. Viscosity modifying additives are well known. Common viscosity modifying additives comprise a low molecular weight compound or polymer such as a polyester. Unfortunately, coating compositions that contain viscosity modifying additives can be unacceptably soft.

An example of a viscosity modifying additive is disclosed in U.S. Pat. No. 5,541,268. The disclosed viscosity modifying additive is a hard to dissolve solid When the solid is dissolved and placed in solution, it often crystallizes out very quickly. Consequently, it is difficult to use the viscosity modifying additive disclosed in U.S. Pat. No. 5,541,268 in liquid coating compositions.

The present invention provides a solvent borne coating composition that has acceptable viscosities and superior performance properties such as hardness, dust free time, etc.

SUMMARY OF THE INVENTION

The present invention is a coating composition comprising:
 a. at least one hydroxyl functional polymer;
 b. a crosslinker capable of crosslinking with said hydroxyl functional polymer (a) to form a film;
 c. a reactive diluent comprising:
  i. 1,3-cyclohexane dimethanol, and
  ii. 1,4-cyclohexane dimethanol; and
In another embodiment, the present invention is a method of coating an article comprising the steps of:
 a. applying over the article a coating composition comprising:
  i. at least one hydroxyl functional polymer,
  ii. a crosslinker capable of crosslinking with said hydroxyl functional polymer to form a film,
  iii. a reactive diluent comprising:
   (A) 1,3-cyclohexane dimethanol, and
   (B) 1,4-cyclohexane dimethanol, and
 b. curing the composition.

DESCRIPTION OF THE INVENTION

Other than in the operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used herein, the term (meth)acrylate refers to both acrylate and methacrylate and includes esters of acrylic and methacrylic acid. The term (meth)acrylic acid refers to both acrylic and methacrylic acid.

The coating composition of the present invention comprises at least one hydroxyl functional polymer, a crosslinker capable of crosslinking with said hydroxyl functional polymer (a) to form a film, and a reactive diluent comprising 1,3-cyclohexane dimethanol and 1,4-cyclohexane dimethanol.

The hydroxyl functional polymer can be any conventional hydroxyl functional film-forming polymer known in the coatings art. Conventional film forming polymers include hydroxyl-containing polymers derived from ethylenically unsaturated monomers such as vinyl and acrylic monomers, hydroxyl functional polymers derived from epoxy polymers, hydroxyl-containing alkyd polymers, polyurethane polyol polymers, polyether polyol polymers or polyester polyol polymers.

When the hydroxyl functional polymer is derived from ethylenically unsaturated monomers, it can comprise functional units and structural units. The functional units can be derived from hydroxyl functional vinyl or acrylic monomers. An example of a hydroxyl functional vinyl monomer is vinyl alcohol. Examples of hydroxyl functional acrylic monomers are hydroxy ethyl (meth)acrylate, hydroxy butyl (meth)acrylate and hydroxy propyl (meth)acrylate.

Other examples of suitable hydroxyl functional monomers are the reaction products of glycidyl (meth)acrylate with monocarboxylic acids such as versatic acid and the reaction product of (meth)acrylic acid with monoepoxy compounds such as Cardura E10 which is commercially available from Shell.

The structural units can be derived from monomers which do not have any functional groups that will react with the crosslinker. Examples of such monomers include non-functional vinyl monomers and alkyl esters of (meth)acrylic acid. Examples of suitable non-functional vinyl monomers are styrene, α-methyl styrene, and tertiary butyl styrene. Examples of suitable alkyl esters of (meth)acrylic acid are $C_{1-12}$ alkyl esters such as methyl (meth)acrylate, ethyl (meth)acrylate, n-butyl (meth)acrylate, t-butyl (meth)acrylate, n-propyl (meth)acrylate and isobornyl (meth)acrylate.

Monomers containing groups other than hydroxyl groups like carboxylic acid groups, amine groups and epoxy groups can be included in the present invention. For example, a monomer containing a carboxylic acid group like (meth)acrylic acid or a monomer containing an amine groups like tertiarybutyl aminoethyl (meth)acrylate can be included.

The functional groups on the hydroxyl functional polymer can be reacted with other compounds to modify the polymer. For example, acid groups on the hydroxyl functional polymer can be reacted with glycidyl functional compounds such Cardura E10 or epoxy groups on the polymer can be reacted with an acid functional compound like versatic acid.

As stated above, the hydroxyl functional polymer can be any conventional hydroxyl functional film-forming polymer. Examples of suitable hydroxyl functional polymers can be found in numerous patents and publications. For example, suitable hydroxyl functional (meth)acrylic polymers are disclosed in U.S. Pat. No. 6,316,119 at column 2, lines 51–61. Suitable hydroxyl functional polymers derived from epoxy polymers are disclosed in U.S. Pat. No. 4,913,972 at column 17, lines 38–61. Suitable polyester polyol polymers are disclosed in U.S. Pat. No. 4,913,972 at column 16, lines 9–2. Suitable hydroxyl-containing alkyd polymers are disclosed in U.S. Pat. No. 6,316,119 at column 4, lines 10–29. Suitable polyurethane polyol polymers are disclosed in U.S. Pat. No. 4,913,972 at column 17, line 62 to column 18, line 7.

The hydroxyl functional polymer can be present in the composition in an amount ranging from 20 to 85 weight percent or from 30 to 80 weight percent or from 40 to 60 weight percent, based on the total solids weight of the composition. The number average molecular weight of the hydroxyl functional polymer is typically from 500 to 100,000 or 600 to 10,000 or 1,000 to 5,000, as measured by gel permeation chromatography using a polystyrene standard. The weight average molecular weight of the hydroxyl functional polymer is typically from 1,250 to 250,000 or 1,300 to 25,000 or 2,500 to 12,500. The hydroxyl functional polymer typically has a hydroxyl value of 500 to 250 or 75 to 200 or 100 to 150. The glass transition temperature of the hydroxyl functional polymer can be from 1° C. to 100° C. or 20° C. to 80° C. or 20° C. to 60° C.

The coating composition of the present invention also comprises a crosslinker capable of crosslinking with the hydroxyl functional polymer to form a film. Examples of suitable crosslinkers include aminoplast and polyisocyanates.

Suitable aminoplast are condensates of amines and or amides with aldehyde. For example, the condensate of melamine with formaldehyde is a suitable aminoplast. Suitable aminoplast are well known in the art. A suitable aminoplast is disclosed in U.S. Pat. No. 6,316,119 at column 5, lines 45–55.

Suitable polyisocyanates include multifunctional isocyanates. Examples of multifunctional polyisocyanates include aliphatic diisocyanates like hexamethylene diisocyanate and isophorone diisocyanate and aromatic diisocyanates like toluene diisocyanate and 4,4'-diphenylmethane diisocyanate. The polyisocyanates can be blocked or unblocked.

Examples of other suitable polyisocyanates include isocyanurate trimers, allophanates, and uretdiones of diisocyanates.

Suitable polyisocyanates are well known in the art and widely available commercially. For example, suitable polyisocyanates are disclosed in U.S. Pat. No. 6,316,119 at columns 6, lines 19–36. Examples of commercially available polyisocyanates include Desmodur N3390 which is sold by Bayer Corporation and Tolonate HDT90 which is sold by Rhone Poulenc.

The crosslinkers are present in the present invention in an amount ranging from 10 to 60 weight percent or from 20 to 50 weight percent or from 20 to 40 weight percent, based on the total solids weight of the composition.

The present invention further comprises a reactive diluent. The reactive diluent comprises 1,3-cyclohexane dimethanol and 1,4-cyclohexane dimethanol. In one embodiment, the reactive diluent is 50 weight percent 1,3-cyclohexane dimethanol and 50 weight percent 1,4-cyclohexane dimethanol, based on the total weight of said reactive diluent. In another embodiment, the reactive diluent is 5 weight percent 1,3-cyclohexane dimethanol and 95 weight percent 1,4-cyclohexane dimethanol, based on the total weight of said reactive diluent. In yet another embodiment, the reactive diluent is 25 weight percent 1,3-cyclohexane dimethanol and 75 weight percent 1,4-cyclohexane dimethanol, based on the total weight of said reactive diluent.

The amount of reactive diluent in the present invention ranges from 2 to 40 weight percent or from 5 to 30 weight percent or from 10 to 25 weight percent, based on the total solids weight of the composition.

The present invention optionally comprises organic solvent. The organic solvent can be any solvent, which will dissolve or disperse the hydroxyl functional polymer, the crosslinker and the reactive diluent. It can be an aliphatic or aromatic hydrocarbon such as Solvesso 100 which is commercially available from ExxonMobil, toluene or xylene, an alcohol such as butanol or isopropanol, an ester such as butyl acetate or ethyl acetate, a ketone such as acetone, methyl isobutyl ketone, methyl isoamyl ketone or methyl ethyl ketone, an ether, an ether-alcohol or an ether-ester or a mixture of any of these.

The amount of organic solvent in the coating composition yields a coating composition having a volatile organic content (VOC) less than 540 g/l or less than 420 g/l or less than 250 g/l.

The coating composition of the present invention can also comprise a polyester derived from 1,3-cyclohexane dimethanol and/or 1,4-cyclohexane dimethanol. This polyester is separate and distinct from the hydroxyl functional polymer component of the present invention.

A preformed mixture of 1,3-cyclohexane dimethanol, 1,4-cyclohexane dimethanol, and polyester can be used in the present invention. Such a mixture can be prepared by synthesizing a polyester with an excess of 1,3-cyclohexane dimethanol and/or 1,4-cyclohexane dimethanol so that a portion remains unreacted after the reaction is finished. The weight ratio of the free 1,3-cyclohexane dimethanol plus 1,4-cyclohexane dimethanol to the polyester in the composition can range from 10:1 to 1:30 or from 1:1 to 1:10.

In different embodiments of the invention, the polyester can comprise at least 40 weight percent of units derived from 1,3-cyclohexane dimethanol and/or 1,4-cyclohexane dimethanol or at least 30 weight percent of units derived from 1,3-cyclohexane dimethanol and/or 1,4-cyclohexane dimethanol or at least 20 weight percent of units derived from 1,3-cyclohexane dimethanol and/or 1,4-cyclohexane dimethanol.

The polyester can also be derived tom 1,3-cyclohexane dimethanol and/or 1,4-cyclohexane dimethanol, one or more polybasic acids, and, optionally, one or more additional polyhydroxy compounds.

Suitable polybasic acids can have two or more carboxylic acid groups or an equivalent number of anhydride groups on the basis that one anhydride group is equivalent to two acid groups. Such polybasic acids are well known in the art. Examples of suitable polybasic acids include $C_{1-6}$ alkane dioic acids such as adipic acid or hexanedioic acid; cycloaliphatic acids such as hexahydrophthalic acid; unsaturated alkane dioic acids such as fumaric or maleic acids; dimer acids; and aromatic acids such as phthalic acid. The anhydrides of the aforementioned polybasic acids such as maleic anhydride or phthalic anhydride can also be used. The polybasic acids can be saturated.

Suitable polyhydroxy compounds can have two or more hydroxyl groups. Such compounds are well known in the art. Examples of suitable polyhydroxy compounds include trimethylol propane, glycerol, neopentyl glycol and pentaerithritol.

The amount of polyester in the present invention can range from 1 to 70 weight percent or from 5 to 40 weight percent or from 10 to 30 weight percent, based on the total solids weight of the composition. The polyester typically has a hydroxyl value of 50 to 300 mg KOH/g of nonvolatile resin or 110 to 170 mg KOH/g of nonvolatile resin. Typically, the polyester has a number average molecular weight of 600 to 4,000 or 600 to 2,000.

The coating composition of the present invention can contain conventional additives for coatings formulations such as pigments, fillers, UV absorbers, flow aids, and catalysts for the curing reaction. An acid such as para-toluene sulfonic acid can be included as a catalysts for aminoplast curing, and a tin compound such as dibutyl tin dilaurate or an amine catalyst such as triethylamine can be included for isocyanate curing.

Coating compositions according to the present invention can be prepared as follows: at least one hydroxyl functional polymer, the crosslinker, and the reactive diluent are mixed together with agitation in the organic solvent until all of the components are dissolved. The components can be added in any order. Optional additives are then added, and the agitation is continued until the additives are dissolved or stably dispersed in the composition.

The coating composition of the invention can be applied to the surface of a substrate by conventional means such as by brush, roller or spray. Typical substrates include metal, plastic, wood and glass. After the coating composition is applied, it can be cured or dried as is well known in the art.

EXAMPLES

The invention will now be illustrated by means of the following non-limiting examples. Table 1 shows the formulation data for the various exemplary compositions. The compositions were prepared as follows: the hydroxyl functional polymer, the additives, and the reactive diluent were mixed together with agitation in the organic solvent until all of the components dissolved. The components were then allowed to equilibrate at 25±1° C. Immediately before use, the crosslinker which was also equilibrated at 25±1° C. was added and thoroughly mixed in.

For evaluation purposes, the compositions were drawn-down on to a 12"×4" glass panel using an 8 micron block spreader and subjected to various tests. Table 2 shows the results of various performance parameters-DIN 4 Viscosity, Dust Free Time, Print Free Time, and Konig Pendulum Hardness.

The DIN 4 viscosity of the exemplary coating compositions was determined n the following manner. First, the exemplary coating composition was allowed to equilibrate at 25±1° C. Second, the DIN 4 cup was placed in a holder that was fixed to a retort stand. Third, the DIN 4 cup was filled with the exemplary coating composition until it started to overflow; the hole underneath the cup was blocked with a finger. Fourth, any air bubbles were allowed to rise to the surface while the cup was kept level. Fifth, the hole underneath the cup was unblocked and a stopwatch was started. The sample was allowed to drain from the cup. The first break in the continuous flow from the hole was recorded as the DIN 4 viscosity.

The Dust Free Time was determined as follow. First, the exemplary coating composition was applied to the panel. Second, the panel was held in a horizontal position and a cotton ball was dropped from three inches above the panel onto the panel. Third, the panel was held with the coated side up for five seconds while the cotton ball was on the coating. Fourth, the panel was flipped over.

If the cotton ball dropped off the panel and no fibers were left in the coating, the coating was said to be "dust free". If the cotton ball remained on the panel or fibers were left in the coating, the second and third steps above were repeated until the coating was said to be "dust free". The time it took for the panel to become "dust free" was recorded.

The Print Free Time was determined as follows. First, the exemplary coating composition was spread on a panel to a uniform film thickness. Second, the applied coating composition was cured at room temperature. Third, the coated panel was placed on a firm level horizontal surface. Fourth, a whatmann filter paper was placed on the panel, a rubber bung was placed on the filter paper with the smaller diameter downwards, and a weight was placed on top of the rubber bung. Fifth, the stopwatch was started.

After one minute, the weight, rubber bung, and filter paper were removed, and the panel was examined for a print. If a mark was not present on the panel, the panel was said to be "print free". If a print was visible, step 4 was done at regular intervals until the panel was deemed to be "print free". The time it took for the panel to become "print free" was recorded.

The Konig Pendulum Hardness was determined in the following manner. First, a panel was coated with an exemplary coating composition and cured. Second, the coated panel was placed on the table of the Konig pendulum stand toward the top of the pendulum with the coating facing up. Third, the pendulum was deflected without lateral displacement of the fulcrum to 6 degrees and allowed to rest against the top of the pendulum stand. Fourth, the endulum was released and the stopwatch was started. The time it took for the swing to fall to 3 degrees was recorded. The Konig Pendulum Hardness was measured after 1 day, 3 days, and 7 days.

Tables 3 shows the results of the Storage Stability test for the exemplary compositions. For this test, the exemplary compositions were made without HDT. The compositions were placed in a glass jar and stored at 2° C. After certain time periods, visual observations were recorded.

TABLE 1

Formulation Data

| Component | Solids | Mol Oh/kg NV | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|---|
| Polymer[1] (g) | 70 | 2 | 93.01 | 70.33 | 66.20 | 73.57 | 56.01 | 56.01 | 52.66 | 56.01 | 56.01 | 56.01 |
| Kflex 188[2] (g) | 100 | 4.1 | | 12.31 | | | | | | | | |
| Kflex UD320[3] (g) | 82 | 6.49 | | | | 14.13 | | | | | | |
| Tone 201[4] (g) | 100 | 3.77 | | | | | | | | | | |
| Tone 210[5] (g) | 100 | 2.41 | | | | | 12.88 | | | | | |
| CHDM[6] (g) | 100 | 13.89 | | | | | | 9.80 | | 4.90 | 8.82 | 7.84 |
| Diol[7] (g) | 100 | 13.89 | | | | | | | 9.80 | 4.90 | 0.98 | 1.96 |
| Hexanediol (g) | 100 | 16.95 | | | | | | | | 9.22 | | |
| 2% DBTDL[8] (g) | 2 | | 2.25 | 2.25 | 2.25 | 2.25 | 2.25 | 2.25 | 2.25 | 2.25 | 2.25 | 2.25 |
| HDT[9] (g) | 100 | 5.24 | 24.85 | 28.42 | 32.03 | 25.58 | 40.95 | 40.95 | 43.88 | 40.95 | 40.95 | 40.95 |
| Butyl Acetate (g) | | | 29.89 | 36.70 | 35.39 | 35.72 | 40.99 | 40.99 | 42.00 | 40.99 | 40.99 | 40.99 |

[1]An acrylic polymer solution having a solids content of 70%, a number average molecular weight of 1300 and a weight average molecular weight of 4400 (the molecular weights were measured by gel permeation chromatography). The acrylic polymer solution was formed as follows: a Charge comprising 202.56 g of alpha-methylstyrene and 479.97 g of methyl isoamyl ketone was heated to reflux in a reaction vessel fitted with stirrer, heating mantle, condenser and nitrogen blanket. Reflux and stirring were maintained throughout the remainder of the process. 83% of feed A comprising 566.19 g of isobornyl methacrylate, 512.58 g of 4-hydroxybutyl acrylate, 202.56 g of alpha-methylstyrene, 285.24 g of t-butyl acrylate, 6.54 g of acrylic acid, 125.55 g of Cardura E10, 44.07 g of 3-mercaptopropionoc acid, 251.88 g of methyl isoamyl ketone, and 89.40 g of Vazo 67 which is commercially available from DuPont was fed into the reaction vessel at a uniform rate over 150 minutes. After a further 30 minutes, the Feed Addition comprising 95.07 g of t-butyl acrylate and 12.99 g of methyl isoamyl ketone was mixed with the remainder of feed A and the mixture was added at a uniform rate over 30 minutes. After a further 30 minutes, Feed B comprising 71.31 g of methyl isoamyl ketone and 10.62 g of di-t-amyl peroxide was added at a uniform rate over 2 hours. Feed C comprising 43.7 g of methyl isoamyl ketone was then added over 2 minutes and reflux was maintained for one hour.
[2]Polyester polyol which is commercially available from King Industries.
[3]Polyurethane diol which is commercially available from King Industries.
[4]Polycaprolactone diol which is commercially available from Dow Chemical
[5]Polycaprolactone diol which is commercially available from Dow Chemical
[6]1,4 cyclohexanedimethanol which is commercially available from Eastman Chemical Company.
[7]a mixture comprising 50 weight percent 1,3-cyclohexane dimethanol and 50 weight percent 1,4-cyclohexane dimethanol.
[8]2% by weight of dibutyl tine dilaure in butyl acetate.
[9]Isocyarurate trimer of hexanethlylane diisocyarate from Rhodia.

TABLE 2

Performance Data

| Performance Test | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| DIN 4 Viscosity (secs) | 28.9 | 21.1 | 24.2 | 24.6 | 18.3 | 19.1 | 17.4 | 18.4 | 18.0 | 18.7 |
| Dust Free Time (mins) | 40–45 | 50–55 | 55–60 | 60–65 | 45–50 | 45–50 | 50–55 | 40–45 | 35–40 | 40–45 |
| Print Free Time (mins) | 180–210 | 210–240 | 240–270 | 210–240 | 150–180 | 150–180 | 210–240 | 150–180 | 150–180 | 150–180 |
| Konig Hardness at 1 day (secs) | 35 | 24 | 28 | 21 | 42 | 40 | 27 | 46 | 39 | 42 |
| Konig Hardness at 3 days (sec) | 58 | 36 | 45 | 38 | 50 | 55 | 35 | 66 | 49 | 54 |
| Konig Hardness at 7 days (secs) | 65 | 39 | 46 | 47 | 56 | 57 | 35 | 69 | 59 | 58 |

TABLE 3

Storage Test Results

| Storage Time (days) | Ex. 5 | Ex. 6 | Ex. 8 | Ex. 9 | Ex. 10 |
|---|---|---|---|---|---|
| 0 | Clear solution | Clear solution | Clear solution | Clear solution | Clear solution |
| 2 | Clear solution | Clear solution | Clear solution | Clear solution | Clear solution |
| 6 | White precipitate | Clear solution | Clear solution | Clear solution | Clear solution |

CONCLUSIONS

Several conclusions can be drawn from the experimental data. First, hexane diol effectively reduces the viscosity of coating compositions, but it has a large negative effect on dry time and hardness. Second, Unoxol-3, 4-diol and CHDM provide a good combination of viscosity reduction and dry time. However, CHDM eventually comes out of solution when stored at low temperatures. Third, the reactive diluent of the present invention does not crystallize out of solution.

We claim:

1. A coating composition comprising:
   a. at least one hydroxyl functional polymer;
   b. a crosslinker capable of crosslinking with said hydroxyl functional polymer (a) to form a film;
   c. a reactive diluent comprising:
      i. 1,3-cyclohexane dimethanol, and
      ii. 1,4-cyclohexane dimethanol.

2. A coating composition according to claim 1 wherein said hydroxyl functional polymer is selected from the group consisting of hydroxyl functional polymers derived from epoxy polymers, hydroxyl-containing alkyd polymers, polyurethane polyol polymers, polyether polyol polymers or polyester polyol polymers.

3. A coating composition according to claim 1 wherein said hydroxyl functional polymer is derived from vinyl and acrylic monomers.

4. A coating composition according to claim 1 wherein said hydroxyl functional polymer comprises 20 to 85 weight percent of the composition based on the total solids weight of the composition.

5. A composition according to claim 1 wherein said crosslinker is a polyisocyanate.

6. A coating composition according to claim 1 wherein said crosslinker comprises 10 to 60 weight percent of the composition based on the total solids weight of the composition.

7. A coating composition according to claim 1 wherein said reactive diluent comprises 50 weight percent of 1,3-cyclohexane dimethanol and 50 weight percent of 1,4-cyclohexane dimethanol, based on the total weight of said reactive diluent.

8. A coating composition according to claim 1 wherein said reactive diluent comprises 25 weight percent of 1,3-cyclohexane dimethanol and 75 weight percent of 1,4-cyclohexane dimethanol, based on the total weight of said reactive diluent.

9. A coating composition according to claim 1 further comprising a polyester derived from 1,3-cyclohexane dimethanol and/or 1,4-cyclohexane dimethanol.

10. A coating composition comprising:
   a. from between 20 to 85 weight percent of at least one hydroxyl functional polymer based on the total solids weight of the composition;
   b. from between 10 to 60 weight percent of crosslinker capable of crosslinking with said hydroxyl functional polymer (a) to form a film based on the total solids weight of the composition; and
   c. from between 2 to 40 weight percent of reactive diluent comprising:
      i. 1,3-cyclohexane dimethanol, and
      ii. 1,4-cyclohexane dimethanol, based on the total solids weight of the composition.

* * * * *

UNITED STATES PATENT AND TRADEMARK OFFICE
CERTIFICATE OF CORRECTION

PATENT NO. : 6,806,314 B2
DATED : October 19, 2004
INVENTOR(S) : David R. Fenn et al.

It is certified that error appears in the above-identified patent and that said Letters Patent is hereby corrected as shown below:

Column 10,
Line 27, insert the following after claim 10:
11. A method of coating an article comprising:
 a. applying over the article the coating composition of claim 1, and
 b. curing the composition
12. A method of coating an article comprising:
 a. applying over the article the coating composition of claim 3, and
 b. curing the composition.
13. A method of coating an article comprising:
 a. applying over the article the coating composition of claim 5, and
 b. curing the composition
14. A method of coating an article comprising:
 a. applying over the article the coating composition of claim 8, and
 b. curing the composition.

Signed and Sealed this

Twenty-second Day of February, 2005

JON W. DUDAS
*Director of the United States Patent and Trademark Office*